United States Patent [19]

Langley

[11] Patent Number: 4,775,255
[45] Date of Patent: Oct. 4, 1988

[54] TERNARY CHORD-TYPE KEYBOARD

[76] Inventor: Lawrence W. Langley, 910 Cardinal Dr., Christiansburg, Va. 24073

[21] Appl. No.: 26,392

[22] Filed: Mar. 16, 1987

[51] Int. Cl.$^4$ ............................................. B41J 5/28
[52] U.S. Cl. ..................................... 400/485; 400/91; 400/100; 400/489; 400/477
[58] Field of Search .................... 400/88, 91, 94, 100, 400/472, 477, 479, 482, 485, 489; 340/365 R, 365 S

[56] References Cited

U.S. PATENT DOCUMENTS

| | | | |
|---|---|---|---|
| 2,532,228 | 11/1950 | Hesh | 400/485 |
| 3,022,878 | 2/1962 | Seibel et al. | 400/485 |
| 3,633,724 | 1/1972 | Samuel | 400/485 |
| 4,201,489 | 5/1980 | Zapp | 400/485 |
| 4,584,443 | 4/1986 | Yaeger | 400/485 |

OTHER PUBLICATIONS

D. L. Conway; "Digital X Typewriter Keyboard", *IBM Tech. Disc. Bull.*, vol. 18, No. 12, pp. 4187–4190; May 1976.
Anon.; "Compact Computer Keyboard", *IBM Tech Disc. Bull.*; vol. 27, No. 10A, pp. 5640–5642; Mar. 1985.

*Primary Examiner*—David A. Wiecking

[57] ABSTRACT

Described is a data entry keyboard having a small number of keys, each key being a ternary device having three possible positions. In the preferred embodiment, each key is adapted to move towards or away from the operator, and has a central "off" position. A spring detent makes the key return to the central position in the absence of pressure from the finger. The three positions of each key are indicated electrically by switches which produce distinctive signals for each of the three states. The top of each key is formed to provide a secure grip. The preferred embodiment comprises eight ternary keys in two sets of four. The two sets are arranged so that the fingers of the operator's right hand rest on the keys of a rightmost set, and the fingers of the operator's left hand rest on the keys of the leftmost set. The only key combinations which represent valid characters are those in which one finger of the right hand operates its key, and one finger of the left hand operates its key. With this scheme of coding, there are 64 possible keyboard states to represent valid characters: all other states are ignored or used as delimiters. This keyboard does not require movement of the fingers from one key to another, and requires only ordinary skill and care on the part of an operator to avoid unwanted states during transitions from one character to the next.

5 Claims, 3 Drawing Sheets

TERNARY CHORD-TYPE KEYBOARD

BACKGROUND OF THE INVENTION

For many years typewriters and most other data entry and control devices have used versions of the standard (QWERTY) keyboard which appeared on the first typewriters. There have been minor changes in the location of keys and the numbers of rows and columns. Symbols, functional controls, etc. have been added as keyboards were adapted to new types of systems and equipment. The pace of change in keyboards has accelerated with the introduction of computers and the development of new kinds of switching devices; matrix key switches, Hall elements, etc. However, most new keyboards have retained the basic features of the Sholes typewriter keyboard designed in 1873:

1. selection of characters by operation of one key at a time; and
2. layout of keys in two or more rows for each hand.

There is another type of keyboard which has found limited use; the chord-type keyboard. In a chord-type keyboard entries are made by operating two or more keys simultaneously. With as few as 10 keys the entire set of numbers and letters and a large number of control characters may be encoded using combinations of two or more keys. There are, in fact, 1024 possible states of 10 keys, seemingly more than enough to represent any desired character set. Despite the large number of states available, 10 keys are not enough for reliable data entry, however. This is because the transitions from state to state are as important as the individual states themselves. When assigning keyboard states to characters, the designer of a chord keyboard must try to avoid assigning a character to any state which is liable to occur by accident between any two valid states. This constraint is an important one, because during entry of text or other data, any sequence of two valid characters may occur. Premature release or early operation of one of the keys in a combination is extremely likely to result in an unwanted entry. As the operator's skill and speed increase, this problem becomes even more severe. Anyone who has operated a chord-type keyboard with ten or fewer keys can testify to the necessity for extreme care and precise timing. The problem of unwanted combinations occurring during transitions is likely to have been the most significant deterrent to adoption and use of chord-type keyboards with 10 or fewer keys.

It has been demonstrated that memorization of chord key combinations to represent letters, numbers and a few control characters is a task readily accomplished by keyboard operator trainees. An extensive 1983 study of two-hand chording by D. Gopher and W. Koenig ("Hands Coordination in Data Entry With a Two Hand Chord Typewriter", *Report CPL*-83-3, Contract N00014-83-K-0092, Illinois University Cognitive Psychophysiology Laboratory, Champaign, Ill.), resulted in the following conclusions:

"The significance of the present results should be examined both from an applied and a theoretical viewpoint. Taken together, they showed that: (a) subjects were able to perform in a touch typing mode, and memorize the codes for all letters, after a brief period of self teaching, (b) that progress in learning was fast and included the development of parallel entry capabilities, (c) that in general, representation of codes by spatial patterns was considerably better than coding by hand symmetry, (d) that performance with an upright tilted panel was better than with a horizontal panel.

These findings raise the possibility that for many system applications, a chord keyboard of the type described in the present study may constitute a viable and attractive alternative to the traditional typewriter or data entry keyboard. Touch typing ability and similar entry speeds on a standard keyboard are the achievements of several months of daily practice (e.g., Hill, Rejall & Thorndyke, 1913; Dvorak, Merrick, Dealy & Ford, 1936; Gentner, 1982). In light of the fundamental differences between the two typing keyboards in their skill components, one can conclude that it appears easier for humans to commit 52 chords to memory and activate them upon request, than to learn the ways of the hand to a similar number of keys spread out on a typing keyboard. This conclusion is also supported by another line of experiment, with a single hand chord typewriter for the Hebrew language (Gopher & Eilam, 1979; Gopher, in press)"

It has also been demonstrated experimentally by Ratz, H. C., and Ritchie, D. K. ("Operator Performance on a Chord Keyboard" *Journal of Applied Psychology*, Vol. 45, No. 5, 1961, 303–308), that subjects who are shown a visual representation of a chord pattern, and then are required to reproduce that pattern in a keyboard with the fingers of one hand, respond most rapidly to single finger patterns. Responses to multiple-finger pattern stimuli take as much as 50% longer.

There have been many attempts to design chord-type keyboards for data entry or machine control, but only two have achieved noteworthy success. The Stenotype machine, a product of the Stenograph Corporation, uses chording to represent a shorthand language for rapid transcription of speech in courtrooms and other legal proceedings. While the operator of this machine presses more than one key at a time to represent a word or phrase, the machine itself makes a separate record of each key depression. Thus chording is not so much a function of the machine as it is of the shorthand language. See U.S. Pat. No. 2,393,781, "Stenographic Machine" by C. W. Johnson, J. G. Sterling, M. H. Wright and R. T. Wright for a description of how this device operates.

The United States Postal Service has employed chording in mailbag dispatching systems, using the chord combinations to represent extraction or destination codes (see Cornog, J. R., Hockman, J. F. and Craig, J. C. "Address Encoding—A Study of the Double-binary Keyboard as a Link in the Machine Sorting of Mail" *ASME* 63-WA-338, Paper presented to the American Society of Mechanical Engineers, New York 1963).

A number of chord-type keyboards have been patented, however none of these has achieved wide acceptance in the marketplace. An early, simple type of chording is illustrated by R. R. Seeber's "Word Writing Typewriter" of U.S. Pat. No. 2,717,686. This machine has a special key which transforms the typewriter keyboard into a word or phrase generator (anticipating today's "Smartkey" computer keyboard enhancement software).

R. Seibel et al described a one hand chord-type "Communication Device" in U.S. Pat. No. 3,022,878. The problem which was alluded to above, of unwanted characters being produced by transition states, is illustrated well by FIG. 6 of this patent, a portion of which is represented below:

| CHAR | FINGER |
|------|--------|
|      | T 1 2 3 4 |
| H    | g e →→→. |
| I    | e : |
| M    | g : |
| U    | e : |
| ,    | g : |
| G    | e g ←←←←: |

Here the character "H" is represented by the index finger being gripped (g) and the middle finger being extended (e). If the next character to be entered is a "G", the positions of these two fingers must be reversed, i.e. the middle finger must be gripped and the index finger extended. Any of four valid characters may be accidently produced during this transition. If the middle finger lags behind the index in leaving the "H" position, an "I" will be produced. If the index finger lags, an "M" will be produced. If the middle finger lags in reaching the new "G" position, a "U" will be produced. If the index finger lags in reaching the "G" position, a "," will be produced. Thorough examination of FIG. 6 will reveal that there are very few transitions free of this problem. The solution adopted by Seibel is to inhibit recognition of any new character until a delay, started by the first switch closure, has time out. The delay must be long enough to inhibit errors with the normal dispersion of operate times, but not long enough to slow the entry process.

In U.S. Pat. No. 4,042,777, "One-handed Keyboard and its Control Means", F. C. Bequaert et al address the transition error problem by adding a circuit which recognizes a character only when the first key of a chord is released. The inventors further reduce the probability of unwanted characters during transitions by using a more restricted set of combinations; i.e. only those produced by adjacent keys.

In his U.S. Pat. No. 4,344,069, "Method and Apparatus for Character Generation", E. S. Prame carries the use of key time sequence one step further, distinguishing between characters encoded by single keys and those represented by chords, with a sequential switching circuit. The operator of such a keyboard may not overlap key strokes for single-key characters, or chord characters will be produced by accident. A similar technique to that of Prame was used earlier in a telephone-style keyboard by R. W. Conway and H. L. Morgan in their "Tele-CUPL: A Telephone Time Sharing System," reported in Communications of the ACM, Volume 10, Number 9, September 1967 (Pp. 538–542).

Another type of keyboard which appears in patents and other publications is one using multiple position keys. The "Electrically Operated Typewriter" described by F. H. Hesh in U.S. Pat. No. 2,532,228 is an example. This machine has only ten keys, but each key has four active positions. Any of 40 characters may be printed by moving a key individually to one of its four positions. R. A. Samuel later patented an "Electrical Typewriter Key and Keyboard Arrangement" (U.S. Pat. No. 3,633,724) which uses eight five-position keys to select the same number of characters in a similar fashion.

The "Digital 'X' Keyboard" described by D. L. Conway in International Business Machines Corporation, *Technical Disclosure Bulletin* Vol. 18, No. 12 of May 1976 (Pp. 4187–4190) also uses multiple state keys, relying on an experienced typist's familiarity with the QWERTY keyboard layout to be able to "touch" type, a single key at a time, with little training.

Multiple position key configurations for such machines are described by W. Zapp in two U.S. Pat. Nos.: 4,081,068 and 4,201,489, both entitled "Keyboard Actuable With the Aid of the Fingers of at Least One Hand".

The motor skills needed to operate any of the keyboards mentioned above are neither rare nor hard to acquire. Apparently the task of memorizing up to 100 chord combinations is within the capability of most operator trainees. Why, then, have those mechanically simple keyboards not replaced the venerable QWERTY? The answer may be that with all keyboards developed to date which have ten or fewer keys, the demands for precision of motion and timing are too great, and an excessively long training period is required to build speed and accuracy.

SUMMARY OF THE INVENTION

Accordingly, the object of the present invention is to provide a data entry keyboard which has a small number of keys and does not require movement of the fingers from one key to another. A further object is to provide a keyboard which requires only ordinary skill and care on the part of the operator to avoid unwanted states while making the transition from one desired entry to the next. These objects are achieved in a keyboard with only eight keys, each key being a ternary device, i.e., having three possible states or positions. The keys are arranged in a finger pattern, each key having a fixed association with one finger. Characters are entered with this keyboard by using simple combinations, for example, two keys at a time; one key operated by a finger of each hand. More complex combinations, such as three keys at a time, are not used because they increase the chance of accidental unwanted character entry during the transition between valid characters.

The preferred embodiment of this keyboard comprises eight ternary keys in two sets of four. The two sets are arranged so that four fingers of the operator's right hand rest on the keys of a rightmost set, and four fingers of the operator's left hand rest on the keys of the leftmost set. The thumbs are not used in the preferred embodiment of the invention. The only key combinations which represent valid characters are those in which one finger of the right hand operates its key, and one finger of the left hand operates its key. With this scheme of state assignment or coding, there are 64 possible keyboard states; all other states are ignored or may be used as delimiters, indicating the space between characters.

In the preferred embodiment of the invention, each ternary key is adapted to move towards or away from the operator, and has a central off position. The three states of each key may be termed "0", "1" and "2", where "0" represents the central, or off position, "1" represents the key being moved towards the operator, and "2" represents the key being moved away from the operator. The top of each key is formed to provide a secure grip by the finger, so that with equal ease the operator's finger may push the key away or pull it towards him. A spring detent is provided to make the key return to the central off, or "0" position, in the absence of pressure from the finger.

The three positions of each key are indicated electrically by one or more switches which produce distinct signals for each of the three states. For example, the keys may operate one switch in the "1" position and another in the "2" position. Closure of the "1" switch would therefore represent a "1" state for that key; closure of the "2" switch would represent a "2" state for that key. The condition in which both switches are open or not operated is the "0" state in this arrangement. The fourth state, with both switches operated, cannot normally be produced, and if an electrical failure should cause it to occur anywhere in the keyboard or connecting circuits, it can be detected easily.

In assigning characters to the 64 possible states of this keyboard, frequently occurring characters such as the letters E, T, A, O, I and N are preferably given combinations which are easy for the operator to remember and produce. The "space bar" function (if required) is also assigned an easy combination.

Complete details of the preferred embodiment, including an example assignment of characters to the key states, and a scheme for reading and interpreting the information entered, are presented in the drawings and description which follow.

BRIEF DESCRIPTION OF THE DRAWINGS

Table 1 is a table of keyboard states with character assignments for a set of alphanumeric and control characters used with the preferred embodiment of the invention.

Table 2 is a table of characters with keyboard state assignments for a set of alphanumeric and control characters used with the preferred embodiment of the invention.

Table 3 is an array of alphanumeric and control characters in computer member which is used with the preferred embodiment of the invention to determine what character is represented by a given keyboard code.

DETAILED DESCRIPTION OF THE INVENTION

All skeletal motions of the human body are controlled by pairs of muscles acting through tendons on opposite sides of a joint. Motion in one direction is produced by contraction of the muscles on one side of the joint while muscles on the other side of the joint are relaxed. Motion in the opposite direction results from a reversal of these conditions. There is a third state, with muscles on both sides of the joint relaxed or tensed: these are equivalent in the end result, there is no motion. Thus the muscular control of the body may be described as ternary, or three-stated, in its outward effects. Consider, for example, the motions of a finger. One set of muscles tends to flex the finger (pull it inward) and another set extends it (pulls it outward). With equal tension in both sets of muscles, there is neither a flexing nor an extending tendency. The keyboard of the invention utilizes these three states of the fingers for data entry and control.

Figure 1:
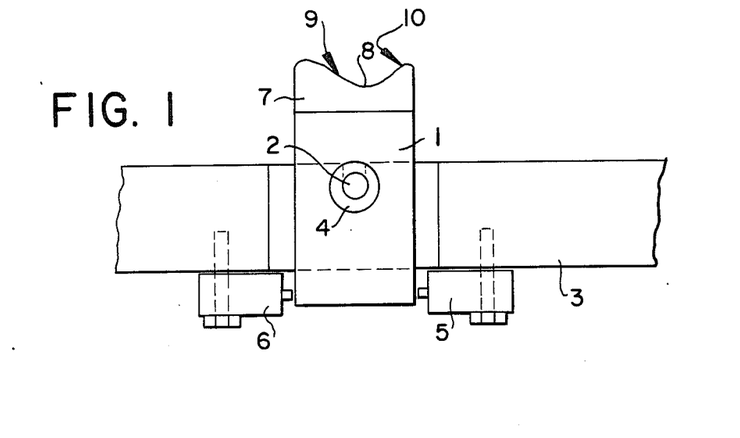
FIG. 1 is a partially sectional view of an individual key according to the preferred embodiment of the invention.

FIG. 1 illustrates a keyboard element adapted to ternary finger control. The keyboard element comprises a key 1, made of a fiber-reinforced plastic material, supported in an aperture in a reinforced plastic base 3 by a pin 2 of stainless steel. The pin 2 is held by slots (not shown) in the base 3 so the key 1 is centered within the aperture. An insert 4 of low friction material such as Teflon (trademark of the DuPont Co.) allows the key to rotate on the pin axis freely. Two Microswitches (trademark of Honeywell Corporation) 5 and 6 are positioned adjacent the lower end of the key so that rotation of the key in one sense will operate the pin plunger of switch 5, and rotation in the other sense will operate the pin plunger of switch 6. In the center position (as illustrated) neither switch is operated. When finger pressure is removed from the key, the internal springs and pin plungers of the switches will return the key to the position shown, and both switches will be off.

Attached to the upper part of the key 1 is a keytop 7 made of a high friction material such as 40 Durometer silicone rubber. The keytop has a shallow groove 8 parallel to the axis of the pin 2, contoured to fit the end of the finger. The rear surface of the groove 9, nearest the operator, is inclined at 30 degrees from the plane of the keyboard. The front surface 10, furthest from the operator, is inclined at 60 degrees from the plane of the keyboard. These angles are chosen to provide a nearly vertical surface for the finger to bear against in pushing the key away from the operator, since this is the less customary motion. The rear surface 9 has enough inclination from the horizontal to provide a good finger grip in pulling the key towards the operator.

With the mounting arrangement shown, the mechanical advantage of the finger in operating the Microswitches depends on the vertical location of pin 2 within the body of the key. With pin 2 in the position illustrated, the force required to operate a switch is approximately equal to the pin plunger restoring spring force, and the finger travel required is only a little more than the travel of the pin plunger. A lower position of the pin 2 will reduce the finger force required while increasing the travel, and a higher position will increase the force and reduce the travel. With Honeywell Model 12SM4-T2 switches, the force to operate the key is from 3 to 5 ounces, and the travel is 0.025 inches in each direction, including over-travel of the pin plunger. The Honeywell 12SM4-T2 switch is small enough to use in a keyboard layout such as that of FIG. 2: it has bifurcated gold-plated contacts suitable for use in a low-voltage, low-current circuit which may be sensitive to switch contact resistance.

One desirable feature of ternary data entry devices is that they are inherently self-clocking; the central or "0" state may be considered one of inactivity or "no information", and can be used for timing of entries (see my U.S. Pat. No. 3,609,306 for an application of this principle in self-clocking codes for material identification). The keyboard of the invention has a large number of states not used for valid characters, these states may be used for timing of entries.

The number of states which must be represented in a data entry keyboard is potentially very large. For example, a Televideo Model 925 keyboard has 101 keys for all its functions, including space bar, cursor controls, alpha, numeric and control characters. A minimal keyboard, on the other hand, might have 12 keys—e.g. the pushbutton telephone. Any scheme for a general purpose data entry keyboard must allow coding of at least the numbers and letters; 36 characters, plus some control characters.

If the ternary states of ten fingers were combined, the sum total of states available to represent characters would be 59,049, many more than needed. The total number of ternary states for four fingers on each hand is 6561, still a large number. If, from the 6561 states for four fingers on each hand a single active state (excluding relaxed) were selected from any one of the four fingers on each hand, the result would be 64 combinations, a practical and useful number for data entry.

Comparing the ternary combinations for four fingers on two hands with the binary combinations for five fingers on two hands (6561 vs. 1024) it is easy to see why the selection of states to reduce the probability of accidental valid entries during transitions is much easier with ternary keys. The assignment of states to characters is still a challenging problem, however. To make the keyboard convenient to use, states should be assigned on the basis of the frequency of individual character occurrence in text, the dexterity of individual fingers, and possibly the frequency of digraphs and trigraphs in text. There may be unsuspected efficiencies or inefficiencies in the way an operator can use ternary keys: these may suggest changes to the state assignments as experience is gained with this new type of keyboard.

A set of state assignments which initially appears to be practical is given in Tables 1 and 2. Table 1 lists the keyboard states (using one finger at a time on each hand) in the order of apparent difficulty. Table 2 lists the alphanumeric character set in normal sequence, with keyboard states assigned according to Table 1. Table 3 illustrates a software method of decoding the keyboard states.

TABLE I

TABLE OF KEYBOARD STATES AND CHARACTERS ASSIGNED

| KEYBOARD | CHARACTER | KEYBOARD | CHARACTER |
|---|---|---|---|
| 00011000 | SP | 10000001 | 2 |
| 00021000 | E | 20000001 | 3 |
| 00012000 | T | 10000002 | 4 |
| 00022000 | A | 20000002 | 5 |
| 00100100 | O | 00010010 | 6 |
| 00200100 | I | 00020010 | 7 |
| 00100200 | N | 00010020 | 8 |
| 00200200 | S | 00020020 | 9 |
| 00010100 | H | 01001000 | , |
| 00020100 | R | 02001000 | . |
| 00010200 | D | 01002000 | ; |
| 00020200 | L | 02002000 | : |
| 00101000 | U | 00100010 | — |
| 00201000 | UC | 00200010 | ? |
| 00102000 | LC | 00100020 | ! |
| 00202000 | CR | 00200020 | / |
| 00010001 | B | 01000100 | $ |
| 00020001 | C | 02000100 | # |
| 00010002 | F | 01000200 | @ |
| 00020002 | G | 02000200 | * |
| 10001000 | J | 10000010 | ( |
| 20001000 | K | 20000010 | ) |
| 10002000 | M | 10000020 | + |
| 20002000 | P | 20000020 | " |
| 00100001 | Q | 01000010 | ' |
| 00200001 | V | 02000001 | = |
| 00100002 | W | 01000002 | % |

TABLE I-continued

TABLE OF KEYBOARD STATES AND CHARACTERS ASSIGNED

| KEYBOARD | CHARACTER | KEYBOARD | CHARACTER |
|---|---|---|---|
| 00200002 | X | 02000002 | BS |
| 10000100 | Y | 01000010 | TB |
| 20000100 | Z | 02000010 | CT |
| 10000200 | 0 | 01000020 | F1 |
| 20000200 | 1 | 02000020 | F2 |

Notes:
0 = Switch centered
1 = Switch toward operator
2 = Switch away from operator
CR = Carriage return, line feed
BS = Backspace
F1 = Function 1
F2 = Function 2
SP = Space
UC = Upper case
LC = Lower case
BS = Back Space
TB = Tab
CT = Control
The assumed order of difficulty in use of the fingers is;
a. middle finger is easiest
b. index finger is next to easiest
c. little finger is next to easiest
d. ring finger is most difficult

TABLE 2

TABLE OF CHARACTERS AND KEYBOARD STATES ASSIGNED

| CHARACTER | KEYBOARD | CHARACTER | KEYBOARD |
|---|---|---|---|
| A | 00022000 | 6 | 00010010 |
| B | 00010001 | 7 | 00020010 |
| C | 00020001 | 8 | 00010020 |
| D | 00010200 | 9 | 00020020 |
| E | 00021000 | SP | 00011000 |
| F | 00010002 | CR | 00202000 |
| G | 00020002 | UC | 00201000 |
| H | 00010100 | LC | 00102000 |
| I | 00200100 | BS | 02000002 |
| J | 10001000 | CT | 02000010 |
| K | 20001000 | TB | 01000010 |
| L | 00020200 | F1 | 01000020 |
| M | 10002000 | F2 | 02000020 |
| N | 00100200 | . | 02001000 |
| O | 00100100 | ; | 01002000 |
| P | 20002000 | : | 02002000 |
| Q | 00100001 | — | 00100010 |
| R | 00020100 | ? | 00200010 |
| S | 00200200 | ! | 00100020 |
| T | 00012000 | / | 00200020 |
| U | 00101000 | $ | 01000100 |
| V | 00200001 | # | 02000100 |
| W | 00100002 | @ | 01000200 |
| X | 00200002 | * | 02000200 |
| Y | 10000100 | ( | 10000010 |
| Z | 20000100 | ) | 20000010 |
| 0 | 10000200 | + | 10000020 |
| 1 | 20000200 | " | 20000020 |
| 2 | 10000001 | ' | 01000001 |
| 3 | 20000001 | = | 02000001 |
| 4 | 10000002 | % | 01000002 |
| 5 | 20000001 | ' | 01001000 |

Notes:
0 = Switch centered
1 = Switch toward operator
2 = Switch away from operator
CR = Carriage return, line feed
BS = Backspace
F1 = Function 1
F2 = Function 2
SP = Space
UC = Upper case
LC = Lower case
BS = Back Space
TB = Tab
CT = Control The sequence of characters in Table 1 is from a table of frequencies in standard English, modified to include the most common control character, the space bar. After the space bar and the most common 12 letters, upper case, lower case and carriage return are listed, even though these are not as frequent as some of the letters which follow. This sequence of listing gives these control characters "easier" combinations, although the combinations involving the little finger are all regarded as equally easy. The first character which uses a ring finger is the number 6. Assignments could be re-structured to assign easier combinations to all the numbers, and use the ring finger for all control characters. This decision should be reserved until more experience is accumulated with the keyboard.

Figure 2:
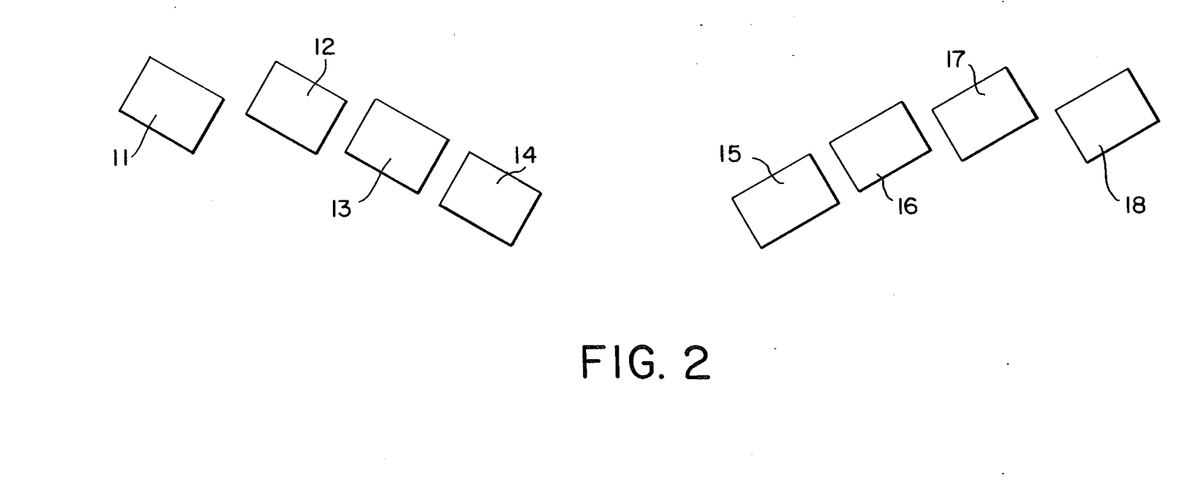
FIG. 2 shows a typical layout of keys for a two-hand keyboard according to the preferred embodiment of the invention.

FIG. 2 shows a keyboard layout which employs four keys per hand in an arrangement which is convenient and comfortable to use. The key rows are generally angled at 60 degrees from each other, an angle which has been found to allow a relaxed posture of the arms and hands. The inner two keys (13,14) and (15,16) in each row are in straight lines, while the remaining keys (11,12) and (17,18) are displaced slightly toward the operator. This displacement compensates for the shortness of the ring and little fingers, allowing them to rest on their keys naturally when the index and middle fingers are in place on their keys.

The keyboard layout of FIG. 2 has been found comfortable for most operators even though the hand positions used by different operators will vary considerably. Some operators will place the hand almost flat against the base of the keyboard, and operate keys with motions of the whole hand and arm. Other operators will elevate the hands, curl the fingers, and use individual finger motions to operate the keys. Either technique is acceptable, although there may be a difference in speed, accuracy and fatigue which depends on the individual operator's hand position.

Figure 3:
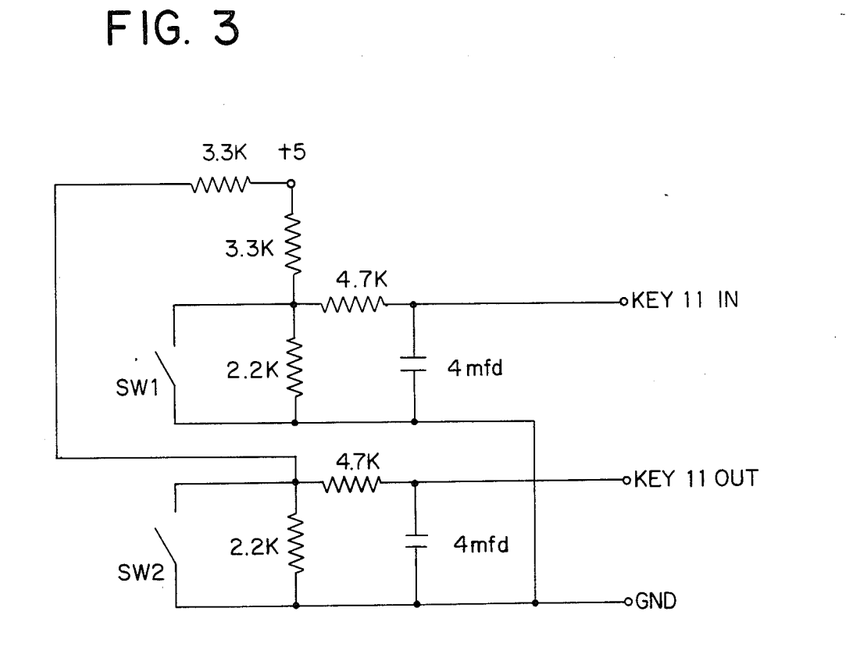
FIG. 3 is a circuit diagram showing a preferred connection to a digital computer, for data entry using the keyboard.

FIG. 3 shows the circuit connections for a single key of a preferred embodiment of the invention. There are two switches SW1 and SW2, and identical circuits which connect them to the computer. Each circuit comprises a voltage dropping network and a low-pass network. The voltage dropping network comprises a 3.3K and a 2.2K resistor which reduce the computer supply voltage to TTL level. The low-pass network comprises a 4.7K resistor and a 4 microfarad capacitor which prevent rapid changes at the circuit output when the switch bounces on make or break. The time constant of the low-pass network is about 20 milliseconds, long enough to smooth out switch bounce, but not long enough to prevent rapid operation and response of the keys.

Figure 4:
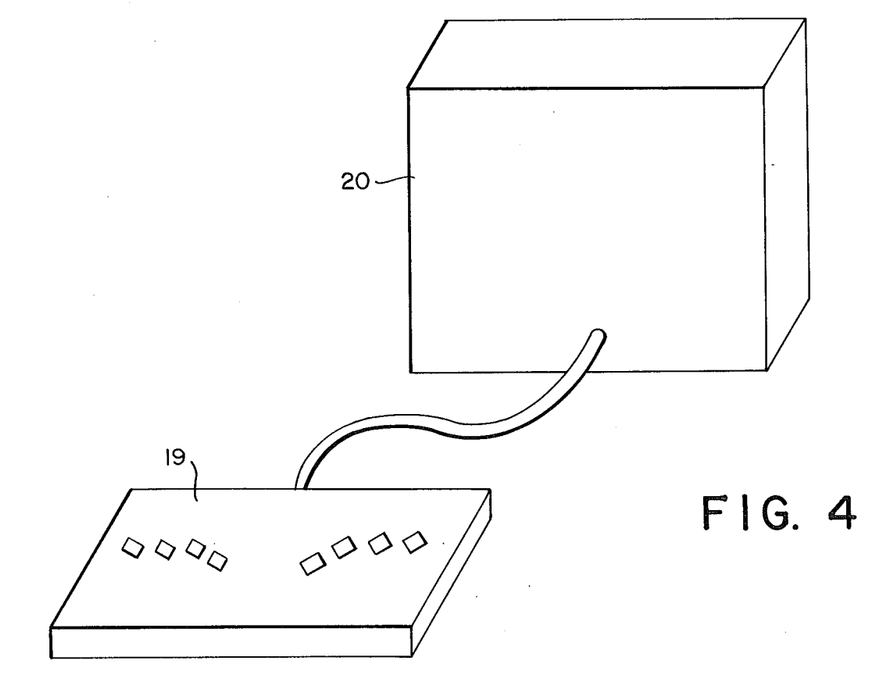
FIG. 4 shows a keyboard of the preferred embodiment connected to a computer.

The circuit connected to switch SW2 is identical to that connected to switch SW1. Thus, for this key there are two signal lines connected to the computer, one labeled "Key 11 in" and a second labeled "Key 11 out. Each key of the keyboard has the same circuits, but all +5 volt supply lines are connected together, as are all grounds. Thus there are 18 lines connecting the keyboard (19, FIG. 4) to the computer (20, FIG. 4). Internally to the computer there are many ways of connecting the signal lines, depending on the type of computer. One way is to use a parallel port, addressing the keyboard lines as an input word mapped somewhere in random access memory. Another method is to use an input/outout device such as a Burr-Brown PCI 20001C-2 carrier board, which provides certain additional functions such as interrupt generation, error detection, and masking of inputs to a selectable memory location. This device can present the 16 signals of the keyboard to the computer in the form of two bytes of information, which are read serially.

The low-pass networks shown in FIG. 3 may be eliminated and the same function performed by software de-bouncing code. In this method, the state of all 16 lines is sampled when the state of any line changes, and then sampled again a short time later. Only when two successive samples yield the same state, does the computer regard the input as valid. This type of de-bouncing can be performed by the main computer or by a peripheral device. Such systems and techniques are well known to those skilled in the art.

There are many techniques available for the conversion of information from the invention to ASCII or other desirable code formats. As an example, the 8 bits produced by the left hand circuits of the keyboard may be combined with the 8 bits of the right hand to select characters from a stored array. Such an array is shown in Table 3, the entries corresponding to the states assigned in Tables 1 and 2.

TABLE 3

CHARACTER SELECTION ARRAY

| | | | RIGHT HAND | | | | | | | |
|---|---|---|---|---|---|---|---|---|---|---|
| | | | SW5 | | SW6 | | SW7 | | SW8 | |
| | | | in | out | in | out | in | out | in | out |
| LEFT HAND | SW1 | in | J | M | Y | 0 | ( | + | 2 | 4 |
| | | out | K | P | Z | 1 | ) | " | 3 | 5 |
| | SW2 | in | , | ; | $ | @ | TB | F1 | ' | % |
| | | out | . | : | # | * | CT | F2 | = | BS |
| | SW3 | in | U | LC | O | N | — | ? | Q | W |
| | | out | UC | CR | I | S | ! | / | V | X |
| | SW4 | in | SP | T | H | D | G | 8 | B | F |
| | | out | E | A | R | L | 7 | 9 | C | G |

Many software techniques can be used to place such a table in computer memory and extract characters from its using the keyboard inputs. The following Basic routines are an example of how this can be done.

```
10 DIM TABLE$(7,7)                'DIMENSION ARRAY, ENTER VALUES
20 FOR I=0 TO 7: FOR J=0 TO 7     'REPRESENTING DECODED KEYBOARD
30 READ TABLE$(I,J)               'INPUTS IN 8×8 ARRAY CALLED
40 NEXT J,I                       '"TABLE$"
50 DATA J,M,Y,O,(,+,2,4
60 DATA K,P,Z,1,),CHR$(034),3,5
70 DATA CHR$(044),CHR$(059),$,@,CHR$(009),CHR$017),',%
```

```
 80 DATA CHR$(046),CHR$(058),#,*,CHR$(019),CHR$(018),=,CHR$(008)
 90 DATA CHR$(024),CHR$(013),I,S,?,/,V,X
100 DATA CHR$(032),T,H,D,6,8,B,F
110 DATA E,A,R,L,7,9,C,G
200 INPUT# DEVICE, LHAND, RHAND     'READ LEFT HAND AND RIGHT HAND
210 IF RHAND=127 THEN I=0           'BYTES FROM "DEVICE"
220 IF RHAND=191 THEN I=1
230 IF RHAND=223 THEN I=2
240 IF RHAND=239 THEN I=3           'CONVERT BYTE VALUE TO INDEX
250 IF RHAND=247 THEN I=4           'VALUE FOR LEFT HAND
260 IF RHAND=251 THEN I=5
270 IF RHAND=253 THEN I=6
270 IF RHAND=254 THEN I=7
280 IF LHAND=127 THEN J=0
290 IF LHAND=191 THEN J=1
300 IF LHAND=223 THEN J=2
310 IF LHAND=239 THEN J=3           'CONVERT BYTE VALUE TO INDEX
320 IF LHAND=247 THEN J=4           'VALUE FOR RIGHT HAND
330 IF LHAND=251 THEN J=5
340 IF LHAND=253 THEN J=6
350 IF LHAND=254 THEN J=7
360 CHAR$=TABLE$(I,J)               'READ CHARACTER FROM TABLE
```

These routines assume that the input bytes from the keyboard represent a closed switch by a ground or "0" level, as shown in FIG. 3. The assignment of bits in each byte is:

| LEFT | HAND | BYTE | RIGHT | HAND | BYTE |
|------|------|------|-------|------|------|
| SW1  | OUT  | B0   | SW5   | OUT  | B0   |
| SW1  | IN   | B1   | SW5   | IN   | B1   |
| SW2  | OUT  | B2   | SW6   | OUT  | B2   |
| SW2  | IN   | B3   | SW6   | IN   | B3   |
| SW3  | OUT  | B4   | SW7   | OUT  | B4   |
| SW3  | IN   | B5   | SW7   | IN   | B5   |
| SW4  | OUT  | B6   | SW8   | OUT  | B6   |
| SW4  | IN   | B7   | SW8   | IN   | B7   |

While this method for reading and interpreting information from the keyboard is somewhat slow, it is straightforward and works well. Furthermore, it provides flexibility to allow experimentation with different assignments of characters to keyboard codes.

EXPERIMENTAL TESTS—RESULTS

An example keyboard was constructed according to the preferred embodiment, and tested by subjects to determine how difficult it would be to learn the code combinations, and to estimate what speed and accuracy might be attained in practice. For rapid exploration of the learning curve, subjects were required to learn codes for numbers only, and then were given random sequences of 50 digits to enter. The results were surprising:

(1) The subjects developed facility in entering numbers in less than one day, achieving a response time of 0.7 seconds per entry within a week.

(2) Entry rate continued to improve gradually, even after a week of practice.

(3) The error rate was typically less than 2% from the beginning.

(4) The easiest combinations to learn and enter were those in which the fingers moved in the same direction, i.e. both toward the subject, or both away.

(5) There were no errors attributable to transitions between codes.

These results indicate that it is easy for operators to learn how to use a chord-type keyboard with ternary keys, and that rapid, accurate data entry is possible using this device. Anticipated problems in memorizing code combinations and in performing ternary finger motions were not experienced at all. Although the tests involved only a few operators, the results were sufficiently consistent to support a prediction that this keyboard will have utility in practical applications.

VARIATIONS WITHIN THE SCOPE OF THE INVENTION

While a preferred embodiment has been described in detail above, keyboards may be designed within the scope of the invention using other types of keys, other character assignments and other methods of keying. Those skilled in the art may find it expedient and desirable to do one or more of the following.

1. Substitute Hall effect or other solid state devices for Microswitches.

2. Substitute other mechanical pivoting arrangements for the pin and low friction sleeve of the preferred embodiment. For example, a hinge arrangement may be advantageous, with the switch or other sensing device located between the pivot point and the finger application point.

3. Modify assignments of keyboard combinations to characters to meet objectives such as software simplification, i.e. to permit direct computation of the index for table lookup instead of using cascaded IF statements, as in the preferred embodiment.

4. Separate the keyboard banks for the two hands in order to allow application of the invention in a vehicle, or in other circumstances where the hands cannot be brought together.

5. Add keys for operation by the thumbs.

6. Employ a reduced number of keys for a reduced character set, i.e. for numbers or alphabetic characters alone.

7. Modify the assignments of characters to keyboard states to use more than one finger per hand for some characters.

8. Use chord combinations of fingers on a single hand to represent some characters in order to reduce effort or permit one-handed operation under certain circumstances.

9. Modify the material or shape of the key to provide a more secure grip by the finger, or to prevent sideways slipping of the finger from the key.

10. Change the layout of keys to provide operator convenience or comfort under varying circumstances such as when standing.

11. Provide a keyboard for one hand only, with a reduced character set.

12. Make certain keys or combinations of keys programmable so that a greater number of characters can be represented. A rudimentary example of this is the upper case, lower case switching capability for alphabetic characters.

It is clear that the invention may be practiced in many different embodiments without departing from the spirit and scope of this disclosure.

I claim:

1. A keyboard for data entry by an operator comprising:
   (a) a support frame;
   (b) eight keys mounted in said support frame, a first group of four of said keys being adapted for operation by the four fingers of the operator's left hand and a second group of four of said keys being adapted for operation by the four fingers of the operator's right hand, each of said keys having three positions selectable by finger motions, wherein said three positions comprise a first position which is selectable by a finger flexing motion, a second position which is selectable by a finger extending motion, and a third position intermediate said first and said second positions selectable by finger relaxation;
   (c) means for deriving electrical signals from each of said keys, said electrical signals distinctively representing said first and said second positions;
   (d) character selecting means, responsive to input from said means for deriving electrical signals of only one signal at a time from said first group and only one signal at a time from said second group, for producing an output indicative of a particular character; and
   (e) delimiter means, responsive to the absence of signals from at least one of said first group of keys or said second group of keys, for indicating the completion of input of a character.

2. The device of claim 1 in which said character selecting means is a computer.

3. The device of claim 1 in which said delimiter means is a computer.

4. The device of claim 1 further comprising invalid character detecting means, responsive to the presence of two or more signals from said first group of keys or two or more signals from said second group of keys, for indicating the input of an invalid character.

5. The device of claim 4 in which said invalid character detecting means is a computer.

* * * * *